(12) United States Patent
Pozio

(10) Patent No.: US 8,485,541 B2
(45) Date of Patent: Jul. 16, 2013

(54) SUSPENSION FOR A TRICYCLE

(76) Inventor: Nicola Pozio, Montesarchio (IT)

( * ) Notice: Subject to any disclaimer, the term of this patent is extended or adjusted under 35 U.S.C. 154(b) by 212 days.

(21) Appl. No.: 12/793,661

(22) Filed: Jun. 3, 2010

(65) Prior Publication Data

US 2011/0298191 A1    Dec. 8, 2011

(51) Int. Cl.
*B60G 3/18* (2006.01)

(52) U.S. Cl.
USPC ............................ 280/124.136; 280/124.107

(58) Field of Classification Search
CPC ....................................................... B60G 7/00
USPC ....... 280/124.111, 124.11, 124.125, 124.134,
280/124.135, 124.136, 124.141, 124.143,
280/124.152, 124.164, 124.103, 124.106,
280/124.107; 180/210
See application file for complete search history.

(56) References Cited

U.S. PATENT DOCUMENTS

| | | | | |
|---|---|---|---|---|
| 1,681,885 A * | 8/1928 | Raab | | 180/358 |
| 2,186,065 A * | 1/1940 | Fischer | | 280/124.136 |
| 3,292,945 A * | 12/1966 | Dangauthier | | 280/6.159 |
| 4,740,013 A * | 4/1988 | Pierce, Jr. | | 280/124.102 |
| 5,320,443 A * | 6/1994 | Lien et al. | | 403/154 |
| 5,364,114 A * | 11/1994 | Petersen | | 280/124.151 |
| 7,140,624 B2 * | 11/2006 | Gerrard | | 280/124.135 |
| 7,311,167 B2 * | 12/2007 | Takayanagi et al. | | 180/215 |
| 7,390,000 B2 * | 6/2008 | Lee | | 280/124.103 |
| 7,487,985 B1 * | 2/2009 | Mighell | | 280/124.103 |
| 7,631,721 B2 * | 12/2009 | Hobbs | | 180/348 |
| 7,722,063 B2 * | 5/2010 | Dieziger | | 280/124.103 |
| 7,959,168 B2 * | 6/2011 | Kiselis et al. | | 280/124.106 |
| 7,967,306 B2 * | 6/2011 | Mighell | | 280/124.103 |
| 8,070,172 B1 * | 12/2011 | Smith et al. | | 280/124.103 |
| 8,141,890 B2 * | 3/2012 | Hughes et al. | | 280/124.103 |
| 2002/0043780 A1 * | 4/2002 | Sandahl et al. | | 280/124.135 |
| 2002/0063005 A1 * | 5/2002 | Klais | | 180/167 |
| 2005/0280241 A1 * | 12/2005 | Bordini | | 280/124.135 |
| 2006/0237941 A1 * | 10/2006 | Smith et al. | | 280/124.135 |
| 2006/0255550 A1 * | 11/2006 | Pfeil et al. | | 280/5.509 |
| 2007/0018419 A1 * | 1/2007 | Kinouchi et al. | | 280/124.134 |
| 2007/0151780 A1 * | 7/2007 | Tonoli et al. | | 180/65.1 |
| 2007/0182120 A1 * | 8/2007 | Tonoli et al. | | 280/124.142 |
| 2007/0193815 A1 * | 8/2007 | Hobbs | | 180/348 |
| 2008/0012262 A1 * | 1/2008 | Carabelli et al. | | 280/124.106 |
| 2008/0258415 A1 * | 10/2008 | Melcher | | 280/124.103 |
| 2010/0195944 A1 * | 8/2010 | Verbowski | | 384/155 |

* cited by examiner

*Primary Examiner* — Karen Beck

(57) ABSTRACT

A suspension for use on two front/rear wheels of a tricycle includes a linking assembly comprising two H-shaped lower supports, two H-shaped upper supports, two coupling members each secured to a hub of the front/rear wheel, and a plurality of internally threaded linkages for pivotably securing the upper supports together, pivotably securing the lower supports together, and pivotably fastening each coupling member between the upper support and the lower support at the same side together; and an elongated shock absorber having both ends secured the upper supports.

4 Claims, 6 Drawing Sheets

ABOUT US 8,485,541 B2

SUSPENSION FOR A TRICYCLE

BACKGROUND OF THE INVENTION

1. Field of Invention

The invention relates to suspensions and more particularly to a suspension for use on two front/rear wheels of a tricycle.

2. Description of Related Art

Suspension for vehicles is known in the art. Moreover, a great number of published documents are known. For example, there is a suspension arrangement for road vehicles. The frame of the vehicle has a pair of pivots displaced from each other, carrying levers, the opposite ends of which are attached to an axle of a wheel, the displacement of the levers about their pivots being restrained to a desired degree by means of springs or the like.

Further, there is a wheel suspension for motor vehicles. It includes a wheel carrier supporting the wheel. Of the wheel guide members, one guide member is displaceable approximately in the transverse direction of the vehicle by way of an adjusting motor and supports the support spring. With its inner end, this guide member is pivotally connected at an intermediate lever. This intermediate lever is pivotally supported at the vehicle body about a pivot axis extending approximately in the vehicle longitudinal direction and is connected at its lower end with the adjusting motor by way of lateral tie rods.

Furthermore, there is an elastic suspension for vehicular automobiles separately suspended.

But the conventional suspension for vehicles including tricycles is complex in structure, expensive to manufacture, and difficult of maintaining.

The invention can eliminate disadvantages of the prior suspensions and provide further advantages.

SUMMARY OF THE INVENTION

It is therefore one object of the invention to provide a suspension for use on two front/rear wheels of a tricycle comprising a linking assembly comprising two H-shaped lower supports, two H-shaped upper supports, two coupling members each secured to a hub of the front/rear wheel, and a plurality of internally threaded linkages for pivotably securing the upper supports together, pivotably securing the lower supports together, and pivotably fastening each coupling member between the upper support and the lower support at the same side together; and elongated shock absorbing means having both ends secured the upper supports.

The above and other objects, features and advantages of the invention will become apparent from the following detailed description taken with the accompanying drawings.

DETAILED DESCRIPTION OF THE INVENTION

Figure 1:
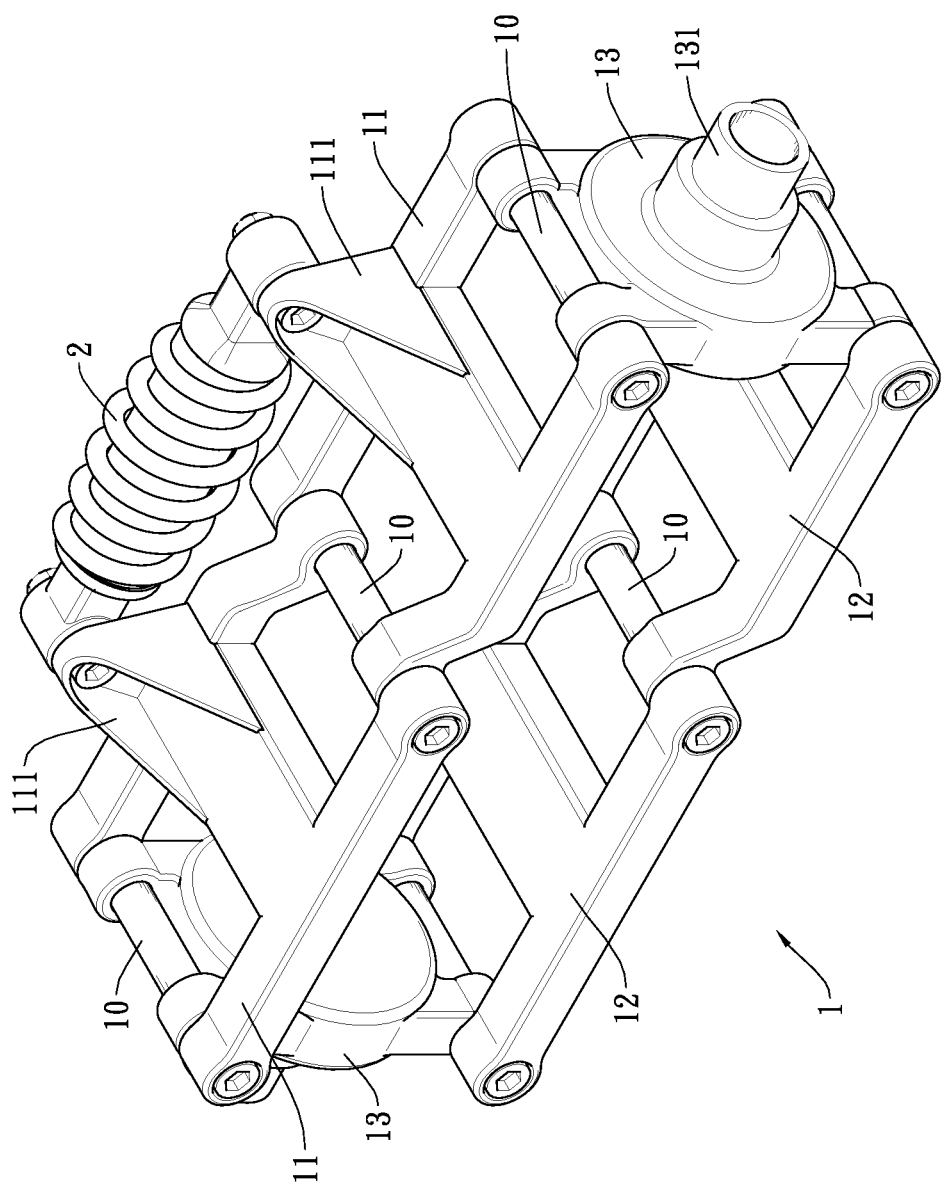
FIG. 1 is a perspective view of a suspension for a tricycle according to the invention.
Figure 2:
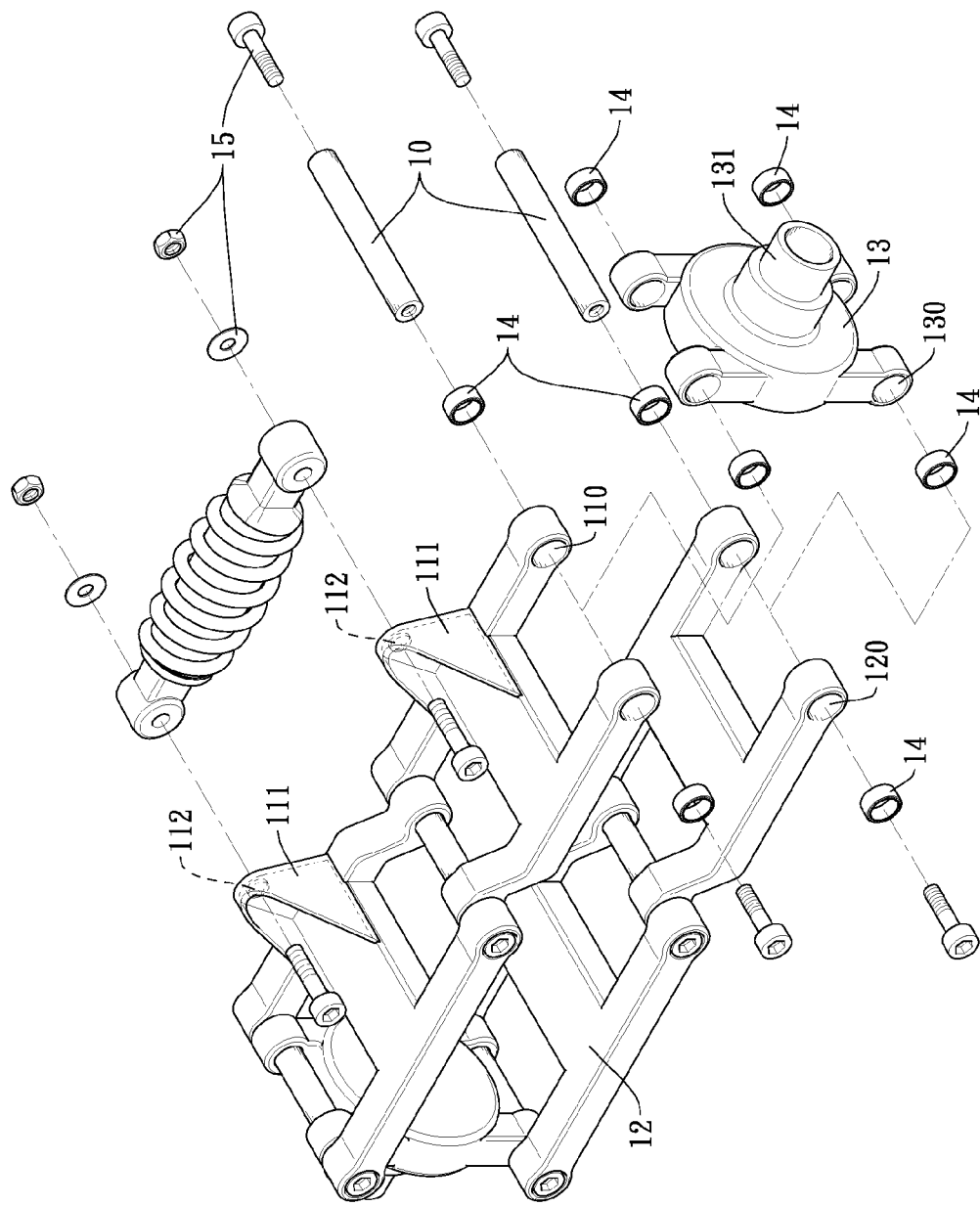
FIG. 2 is an exploded view of FIG. 1.
Figure 3:
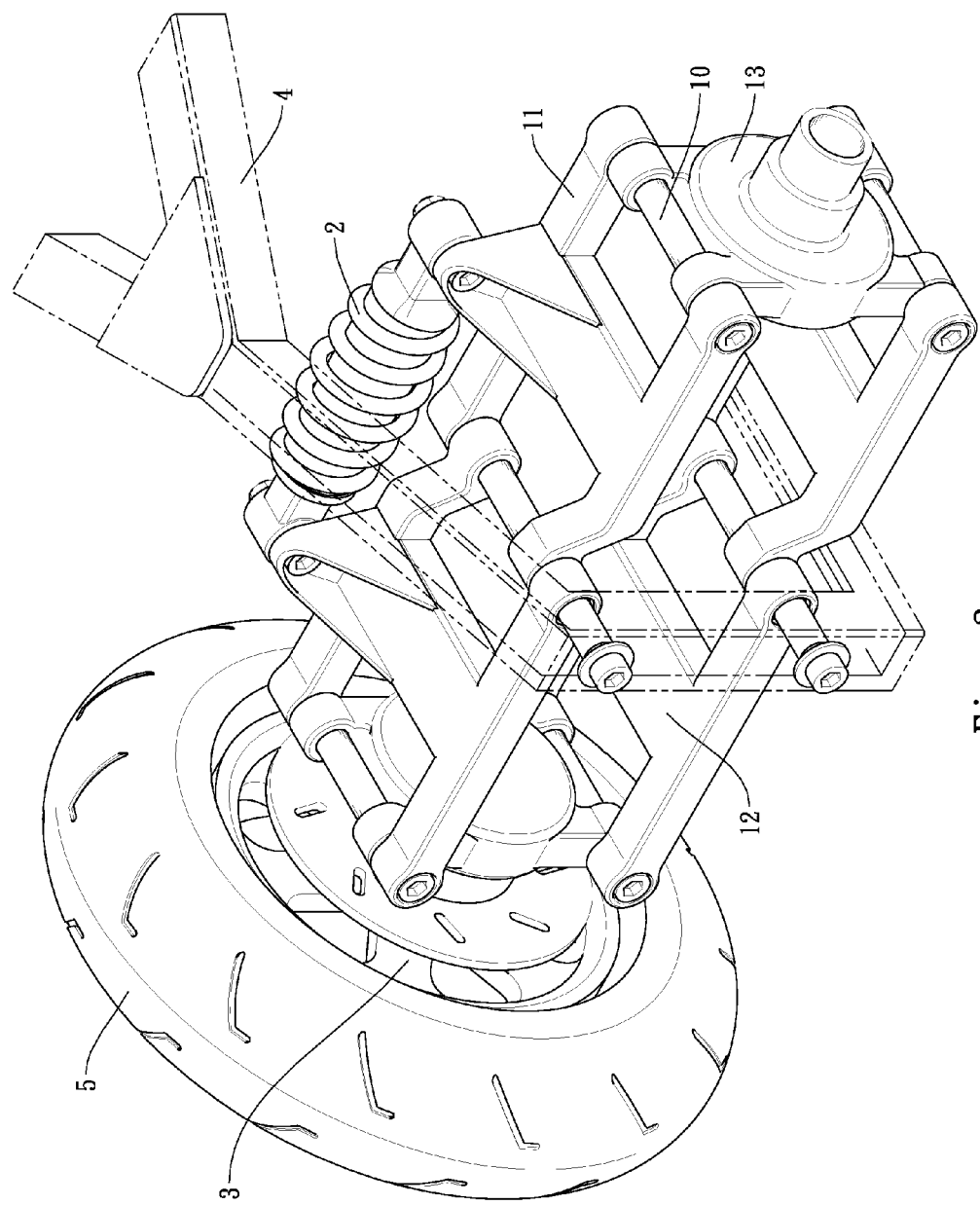
FIG. 3 is a perspective view of the suspension mounted on two front/rear wheels (only one wheel is shown) of a tricycle.

Referring to FIGS. 1 to 3, a suspension for use on two front/rear wheels 5 of a tricycle 4 in accordance with the invention comprises the following components as discussed in detail below.

A linking assembly 1 comprises a plurality of internally threaded linkages 10, two H-shaped upper supports 11, two H-shaped lower supports 12, and two coupling members 13. Each of the upper supports 11 has a through hole 110 at one of four ends. Each of lower supports 12 has a through hole 120 at one of four ends. A bearing 14 is provided in each through hole 110 or 120. A concave mounting member 111 having a threaded hole 112 is provided on top of the interconnecting part of each upper support 11. Each coupling member 13 having a projecting stepped-outer diameter hollow coupling 131 and four projections arranged as four corners of a rectangle, each projection having a through hole 130.

In assembly, each of two threaded fasteners (e.g., bolt and nut combinations) 15 is used to drive through either end of a spring loaded shock absorber 2 and the threaded hole 112 to secure the shock absorber 2 and the upper support 11 together.

A linkage 10 loosely passes through a bearing 14, one through hole 110 of one upper support 11, one through hole 110 of the other upper support 11, another through hole 110 of one upper support 11, and one through hole 110 of the other upper support 11 into another bearing 14 to have one end disposed in one through hole 110 of one upper support 11 and the other end disposed in one through hole 110 of the other upper support 11 respectively. A threaded fastener 15 is driven into one end of the upper support 11 and another threaded fastener 15 is driven into the other end of the upper support 11 at the same side. Thus, two upper supports 11 are pivotably secured together. Likewise, the two lower supports 12 can be pivotably secured together.

Another linkage 10 loosely passes through a bearing 14, one through hole 110 of one upper support 11, one through hole 110 of the coupling member 13, another through hole 110 of the coupling member 13, and another through hole 110 of one upper support 11 into another bearing 14 to have one end disposed in one through hole 110 of one upper support 11 and the other end disposed in one through hole 110 of one upper support 11 respectively. A threaded fastener 15 is driven into one end of the upper support 11 and another threaded fastener 15 is driven into the other end of the upper support 11 at the same side. Thus, one upper support 11 and the coupling member 13 are pivotably secured together. Likewise, each of the two coupling members 13 can be pivotably secured between the upper support 11 and the lower support 12 at the same side. Moreover, the coupling 131 of either coupling member 13 can be secured to a hub 3 of a wheel 5 by means of a bearing 4. As an end, the invention is assembled.

Figure 4:
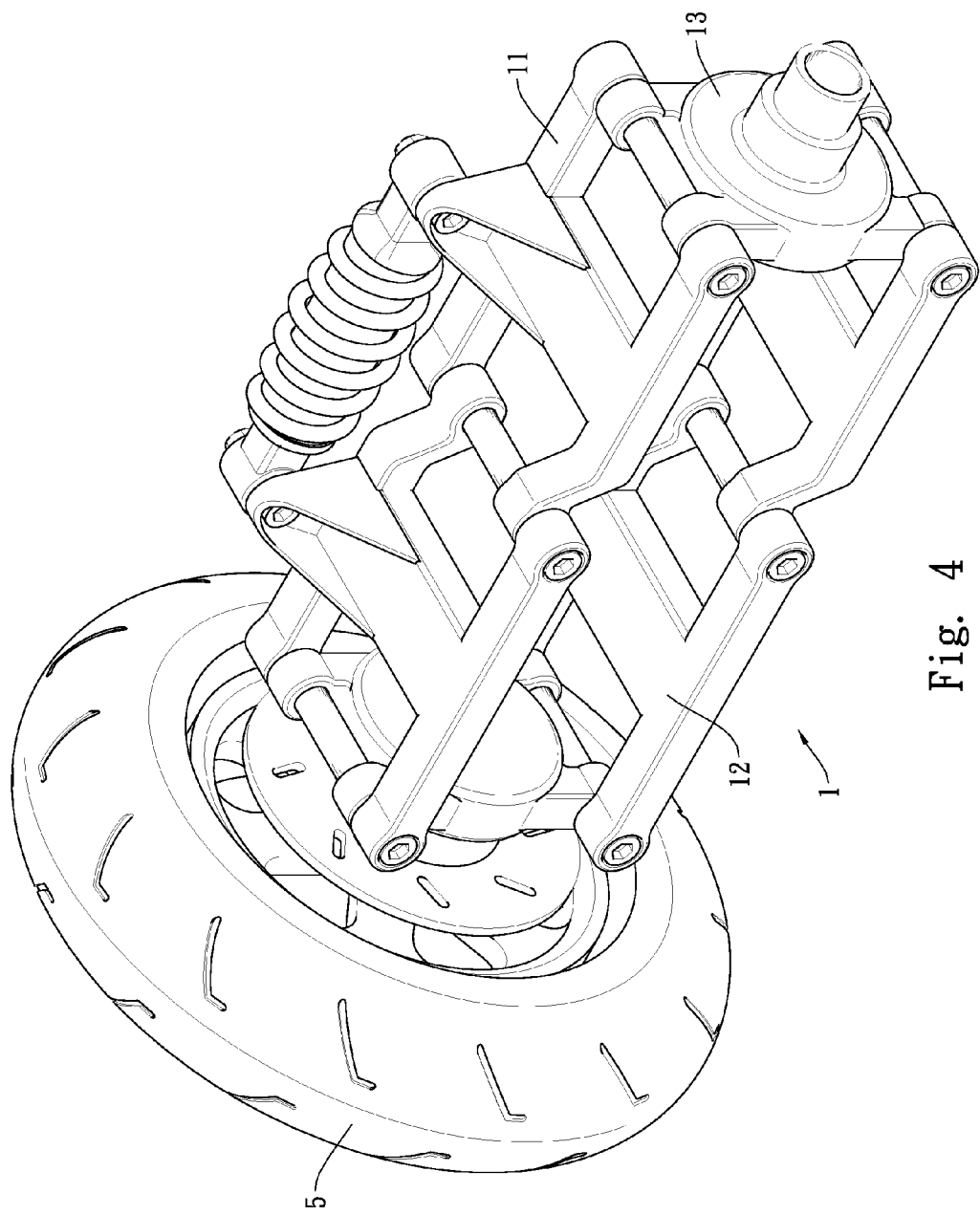
FIG. 4 is a view similar to FIG. 3 where the tricycle is wheeling in a stable state.

Referring to FIG. 4, the tricycle is wheeling in a stable state. That is, no irregularities are encountered. A substantially rectangle can be seen from a front/rear end of the suspension.

Figure 5:
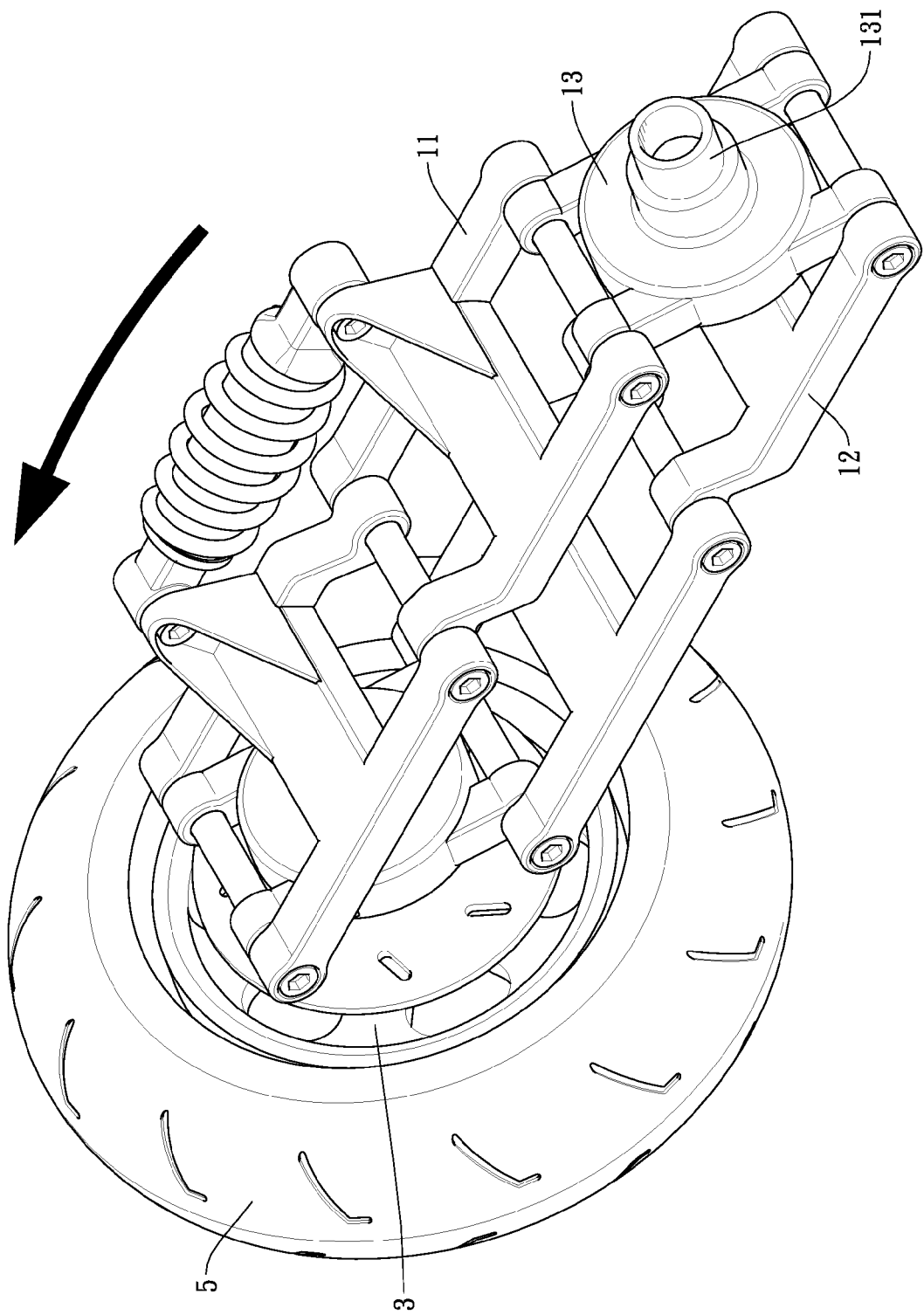
FIG. 5 is a view similar to FIG. 4 where both the front/rear wheels are tilting (only one wheel is shown) when wheeling through a curve of road.

Referring to FIG. 5, it is shown that two front/rear wheels 5 are tilting (only one wheel 5 is shown) when wheeling through a curve of road. Moreover, the suspension is tilted toward one wheel 5 to shape as a parallelogram. This has the benefit of preventing the vehicle from tipping over when passing a curve of road.

Figure 6:
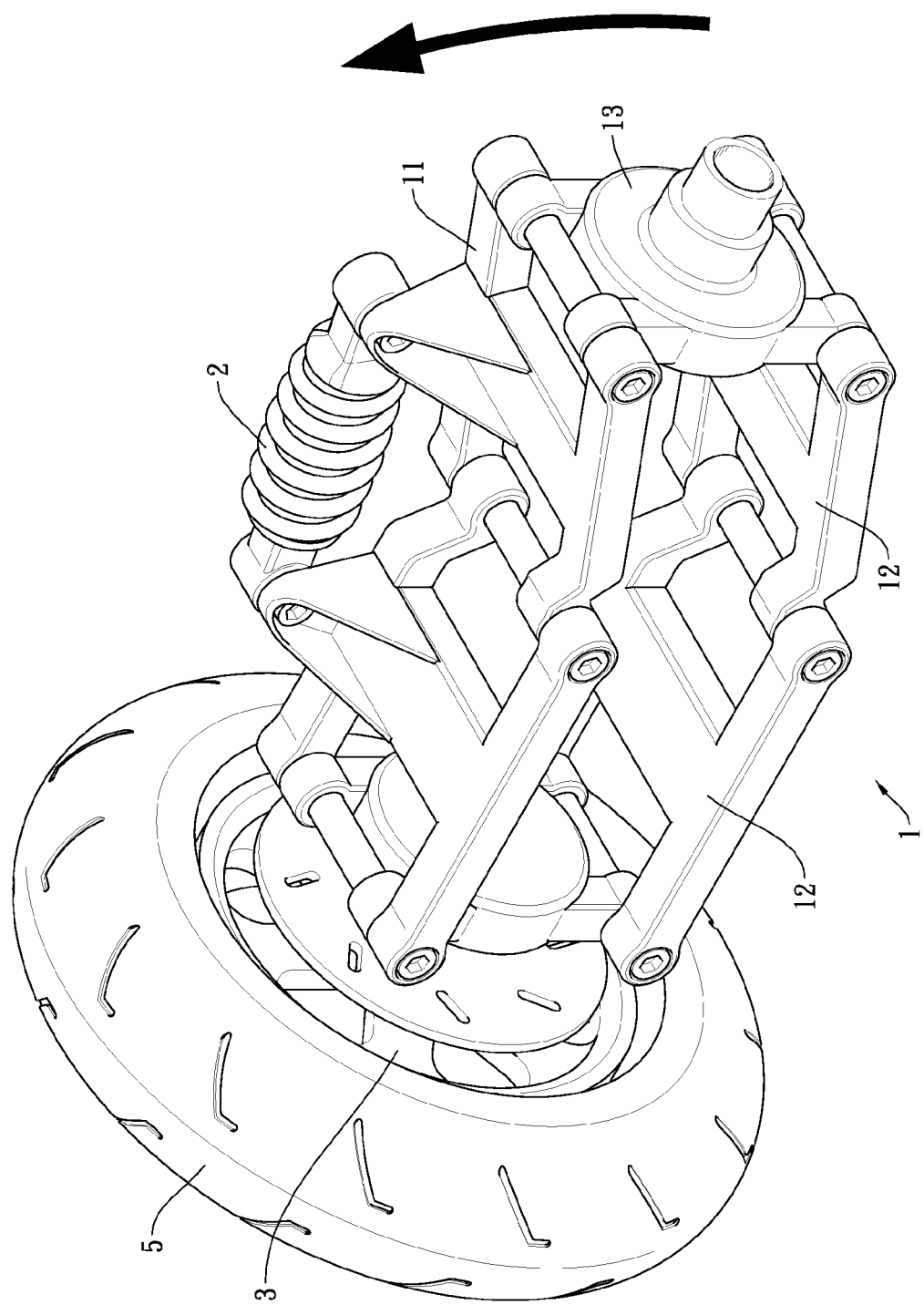
FIG. 6 is a view similar to FIG. 4 where the other front/rear wheel (not shown) is encountered a raised area of the road.

Referring to FIG. 6, the other wheel (not shown) is encountered a raised area of the road. The left portion of the suspension is substantially not affected and the right portion thereof is pivotably lifted a short distance with the shock absorber 2 being compressed. Therefore, the force of shocks and jarring is substantially absorbed by the shock absorber 2. This can minimize discomfort when such irregularities encountered.

While the invention has been described in terms of preferred embodiments, those skilled in the art will recognize that the invention can be practiced with modifications within the spirit and scope of the appended claims.

What is claimed is:

1. A suspension for use on two wheels of a vehicle comprising:
   a linking assembly comprising:
      two H-shaped lower supports directly pivoted together;
      two H-shaped upper supports directly pivoted together;
      two coupling members each directly coupled by means of a bearing to a hub of a respective wheel, each coupling member comprising four projections for engaging two ends of a corresponding upper support and two ends of a corresponding lower support and a coupling extending from a surface of the coupling member for engaging with the respective wheel by means of the bearing, wherein pivoting of each coupling is determined solely by corresponding movements of the associated projections; and
   a plurality of internally threaded linkages for directly pivotably securing the upper supports together, directly pivotably securing the lower supports together, and pivotably fastening each coupling member between the upper support and the lower support on the same side together; and
   elongated shock absorbing means having ends secured to the upper supports.

2. The suspension of claim 1, wherein each upper support comprises a mounting member adapted to releasably secure to either end of the shock absorbing means by a threaded fastener.

3. A tricycle comprising a first suspension at a first end, the first suspension comprising:
   a linking assembly comprising:
      two H-shaped lower supports directly pivoted together;
      two H-shaped upper supports directly pivoted together;
      two coupling members each directly connected to a hub of a respective wheel by means of a respective bearing, each coupling member comprising four projections for engaging two ends of a corresponding upper support and two ends of a corresponding lower support and a coupling extending from a surface of the coupling member for engaging with the respective wheel using the respective bearing, wherein pivoting of each coupling is determined solely by corresponding movements of the associated projections; and
   a plurality of internally threaded linkages for directly pivotably securing the upper supports together, directly pivotably securing the lower supports together, and pivotably fastening each coupling member between the upper support and the lower support on the same side together; and
   elongated shock absorbing means having ends secured to the upper supports.

4. The suspension of claim 3, wherein each upper support comprises a mounting member adapted to releasably secure to either end of the shock absorbing means by a threaded fastener.

* * * * *